United States Patent
Saghir et al.

(10) Patent No.: US 11,985,521 B2
(45) Date of Patent: *May 14, 2024

(54) DYNAMIC SMALL CELL RADIO FREQUENCY (RF) OPTIMIZATION

(71) Applicant: Verizon Patent and Licensing Inc., Basking Ridge, NJ (US)

(72) Inventors: Amir Saghir, Frisco, TX (US); Said Hanbaly, Prosper, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,426

(22) Filed: Mar. 20, 2023

(65) Prior Publication Data

US 2023/0224730 A1 Jul. 13, 2023

Related U.S. Application Data

(63) Continuation of application No. 17/009,842, filed on Sep. 2, 2020, now Pat. No. 11,638,165.

(51) Int. Cl.
| | |
|---|---|
| H04W 24/02 | (2009.01) |
| H04B 1/00 | (2006.01) |
| H04B 17/318 | (2015.01) |
| H04W 28/02 | (2009.01) |
| H04W 52/24 | (2009.01) |
| H04W 72/542 | (2023.01) |

(52) U.S. Cl.
CPC ............ *H04W 24/02* (2013.01); *H04B 1/005* (2013.01); *H04B 17/318* (2015.01); *H04W 28/0236* (2013.01); *H04W 52/245* (2013.01); *H04W 72/542* (2023.01)

(58) Field of Classification Search
CPC ............. H04W 24/02; H04W 28/0236; H04W 52/245; H04W 72/542; H04W 52/143; H04W 52/247; H04B 1/005; H04B 17/318; H04B 17/327; H04B 17/382
See application file for complete search history.

(56) References Cited

U.S. PATENT DOCUMENTS

| | | | |
|---|---|---|---|
| 2013/0235746 A1* | 9/2013 | Patel | H04W 24/02 370/252 |
| 2015/0334612 A1 | 11/2015 | Ray Chaudhuri et al. | |
| 2017/0013627 A1 | 1/2017 | Mitra et al. | |
| 2017/0094669 A1 | 3/2017 | Chandwani et al. | |
| 2017/0265195 A1* | 9/2017 | Naghshvar | H04W 72/52 |
| 2018/0007564 A1* | 1/2018 | Li | H04W 76/00 |

* cited by examiner

*Primary Examiner* — Jae Y Lee
*Assistant Examiner* — Aixa A Guadalupe Cruz

(57) ABSTRACT

A method, device, and non-transitory computer-readable medium provide for scanning, by a device, a radio service area of a small cell radio access node to detect radio signals of one or more radio frequency (RF) bands, the radio signals including transmissions associated with one or more other small cell radio access nodes that are operating in a vicinity of the small cell radio access node, and the small radio access node being configured to alternately operate at multiple RF bands including the one or more RF bands; determining, by the device, a signal strength associated with each of the one or more RF bands; and dynamically optimizing, by device, operation of the small cell radio access node based on the signal strength associated with each of the one or more RF bands.

20 Claims, 8 Drawing Sheets

DYNAMIC SMALL CELL RADIO FREQUENCY (RF) OPTIMIZATION

CROSS REFERENCE TO RELATED APPLICATION

This patent application is a continuation of U.S. patent application Ser. No. 17/009,842 filed Sep. 2, 2020, the disclosure of which is incorporated by reference herein in its entirety.

BACKGROUND INFORMATION

Low-power cellular radio access node ("small cell") densification is an integral part of deploying radio frequency (RF) communications technology for delivering high bandwidth and high data throughput for low latency applications, such as Ultra-Reliable Low Latency Communication (URLLC) and massive Machine Type Communication (mMTC). Design scenarios for providing pervasive wireless connectivity throughout an expansive enterprise site (e.g., office suite, shopping center, warehouse, government complex, hotel, school campus, etc.) include high-density deployment of small cells (e.g., femtocells, picocells, microcells, wireless relays, etc.) that operate on high frequency millimeter wave (mmWave), lower frequency sub-6 gigahertz (GHz) frequency bands, as well as other RF bands. Managing all the various types of RF environments (e.g., inter-cell signal interference due to overlapping service areas) associated with high-density small cell deployment architecture poses various challenges.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

In order to extend cellular wireless signal coverage in indoor settings at customers' designated service locations, a provider of wireless communication services may deploy femtocells or other low-power cellular base stations in a high-density configuration to improve radio access environments that would otherwise exhibit weak cellular coverage. A femtocell may use an existing Internet connection as a backhaul connection to a service provider's core network, rather than having a direct connection to the core network like larger base stations (which may be referred to as "macrocells"). For example, to reach an application server, a user's data may pass through the femtocell to a router or switch (and firewall) and then through an Internet service provider (ISP) gateway device to reach the core network.

High-density small cell deployment gives rise to inter-cell performance issues. As an example, RF signals used by a first small cell are subject to signal interference from signals of a same frequency/frequency band used by one or more neighboring cells with at least partially overlapping coverage areas. The resultant signal degradation causes packet drops in the first cell site which causes resource-wasting packet retransmissions. As another example, discontinuity in the frequency ranges used in neighboring small cells may cause inter-cell handover inefficiencies and/or failures. Existing approaches to cell-site RF environment optimization do not scale in high-density small cell deployment scenarios.

Techniques described herein relate to the dynamic modification of the serving band used by a small cell in a high-density deployment environment. A small cell, such as a femtocell, may be capable of providing service to user equipment (UE) devices on two or more different frequency bands (e.g., Sub-6, mmWave, etc.). In one implementation, the small cell may scan its service area to obtain cell-site RF environment information relating to other small cells in proximity to the small cell. The cell-site RF environment information may include, for example, RF frequency bands used by one or more of the neighboring small cells and an indication of the corresponding signal strengths. As described herein, the small cell may select, during power-up, a frequency band to use that minimizes interference from an RF band(s) that is detected in its service area and/or which complements the detected RF band for seamless session handovers from small cell to small cell.

Figure 1:
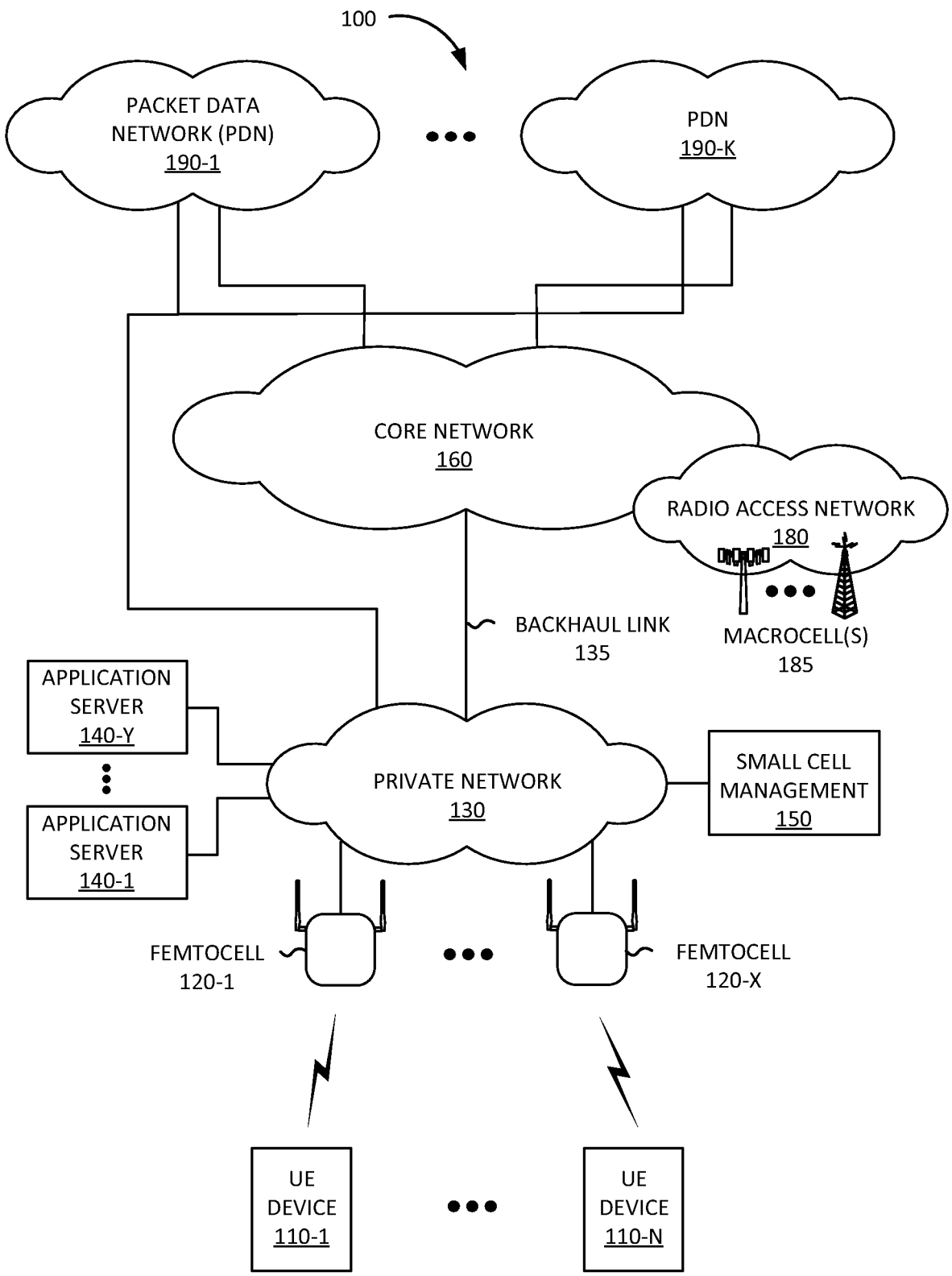
FIG. 1 illustrates a network environment according to an implementation described herein.

FIG. 1 is a diagram of an exemplary environment 100 in which the systems and/or methods, described herein, may be implemented. As shown in FIG. 1, environment 100 may include UE devices 110-1 to 110-N (referred to herein collectively as "UE devices 110" and individually or generally as "UE device"), femtocells 120-1 to 120-X (referred to herein collectively as "femtocells 120" and individually as "femtocell 120"), a private network 130, application servers 140-1 to 140-Y (referred to herein collectively as "application servers 140" and individually or generally as "application server 140"), a small cell management device 150, a core network 160, a radio access network (RAN) 180, and packet data networks (PDNs) 190-1 to 190-K (referred to herein collectively as "PDNs 190" and individually or generally as "PDN 190").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a smart TV, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device. In one embodiment, UE device may include an RF scanner or the like that is capable of determining local RF conditions and generating a data report that identifies the local RF conditions and may forward the report to femtocell 120.

Femtocell 120 may provide a cellular wireless connection from UE devices 110 to private network 130. For example, femtocell 120 may include an RF transceiver configured to communicate with UE devices using a 5G NR air interface using a 5G NR protocol stack, a 4G LTE air interface using a 4G LTE protocol stack, and/or using another type of cellular air interface. Femtocell 120 may authenticate UE device 110 with a subscriber management device (e.g., Unified Data Management (UDM) in 5G, Home Subscriber Server (HSS) in 4G, etc.) and may establish an encrypted wireless communication channel with UE device 110 (e.g., using Internet Protocol Security (IPSec), Transport Layer Security (TLS), etc.) using a symmetric key handshake or using other types of security measures.

Furthermore, femtocell 120 may include a small cell manager that dynamically manages RF optimization, including a selection of RF bands, power levels, etc., for an associated service area. The small cell manager may include, for example, a dedicated radio for RF spectrum monitoring, such as a "sniffer" receiver, antenna, or other circuitry that may be used to measure the current signal strength of signals from one or more nearby femtocells 120. In some implementations, small cell manager may determine optimal signal power levels to be used in transmissions based on the observed cell-site RF environment. For example, signal power level management may be used to adapt the service area's footprint of the small cell (e.g., femtocell 120) relative to the service area footprints of nearby small cells (e.g., other femtocells 120). Furthermore, femtocell 120 may use the infrastructure of private network 130 to provide a backhaul link 135 to core network 160. Femtocells 120 may facilitate inter-cell handovers in private network 130. For example, UE device 110 may move from a service area of one femtocell 120 to the service area of another femtocell 120 (e.g., in a different area of a building, etc.) and a network connection may be handed over from one femtocell 120 to another femtocell 120, for example, using the same RF band.

Private network 130 may include a limited-access Layer 2 and/or Layer 3 network associated with an enterprise, such as a business, a school, a public facility, mass transit, a government agency, and/or another type of enterprise. Private network 130 may enable femtocells 120, application servers 140, and/or small cell management device 150 to communicate with each other, to communicate with core network 160, and/or to communicate with PDNs 190.

Application servers 140 may each provide an application service for UE devices 110 via private network 130. For example, application server 140 may host a web site or an application used or accessed by UE device 110, may collect information from UE devices 110 or send instructions to UE devices 110 (e.g., in MTC applications, etc.), and/or may otherwise communicate and/or interact with UE devices 110.

Small cell management server 150 may include one or more devices that provide management and/or provisioning services relating to femtocells 120. For example, small cell management server 150 may monitor and/or coordinate frequency signal selection among some or all of femtocells 120 associated with private network 130. In some implementations, some or all control signaling associated with femtocells 120 may be performed through small cell management server 150. In other implementations, small cell management server 150 may coordinate or perform provisioning procedures based on RF scanning and frequency band and/or signal power information obtained from each femtocell 120, for example, upon power-up and/or responsive to some other triggering event and/or predetermined period.

Core network 160 may be deployed and/or operated by a provider of cellular wireless communication services and may manage communication sessions of subscribers connecting to core network 160 via femtocells 120 and/or via RAN 180. For example, core network 160 may establish an IP connection between UE devices 110 and PDN 190.

In some implementations, core network 160 may include a 5G core network including devices that implement network functions that include an Access and Mobility Function (AMF) to perform registration management, connection management, reachability management, mobility management, and/or lawful intercepts; a Service Mobility Function (SMF) to perform session management, session modification, session release, IP allocation and management, Dynamic Host Configuration Protocol (DHCP) functions, and selection and control of a UPF; a UPF to serve as a gateway to PDN 190, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a UDM to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

In other implementations, core network 160 may include an LTE core network (e.g., an evolved packet core (EPC) network) including devices that implement network functions that include a Mobility Management Entity (MME) for control plane processing, authentication, mobility management, tracking and paging, and activating and deactivating bearers; a serving gateway (SGW) that provides an access point to and from UE devices, acts as a local anchor point during handovers, and directs gateway to a PDN Gateway (PGW); a PGW that functions as a gateway to a particular PDN 190; a Policy and Charging Rules Function (PCRF) that implements policy and charging rules functions, such as establishment of Quality of Service (QoS) requirements, setting allowed bandwidth and/or data throughput limits for particular bearers, and/or other policies; and an HSS that stores subscription information for UE devices, including subscription profiles that include authentication and access authorization information, group device memberships, subscription privileges, and/or other types of subscription information.

RAN 180 may include one or more macrocells 185. Each macrocell 185 may include devices and/or components configured to enable cellular wireless communication with UE devices 110. Macrocell 185 may include a 5G NR base station (e.g., a gNodeB) and/or a 4G LTE base station (e.g., an eNodeB). Core network 160 may facilitate handovers between femtocell 120 and macrocell 185. For example, if UE device 110 leaves a building serviced by femtocell 120, a connection of UE device 120 may be handed over to macrocell 185. Similarly, if UE device 110 enters a small cell service area, a connection may be handed over from macrocell 185 to femtocell 120.

PDNs 190-A to 190-N may each include a particular PDN 190 associated with an Access Point Name (APN), and UE device 110 may request a connection to PDN 190 using the APN. PDN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
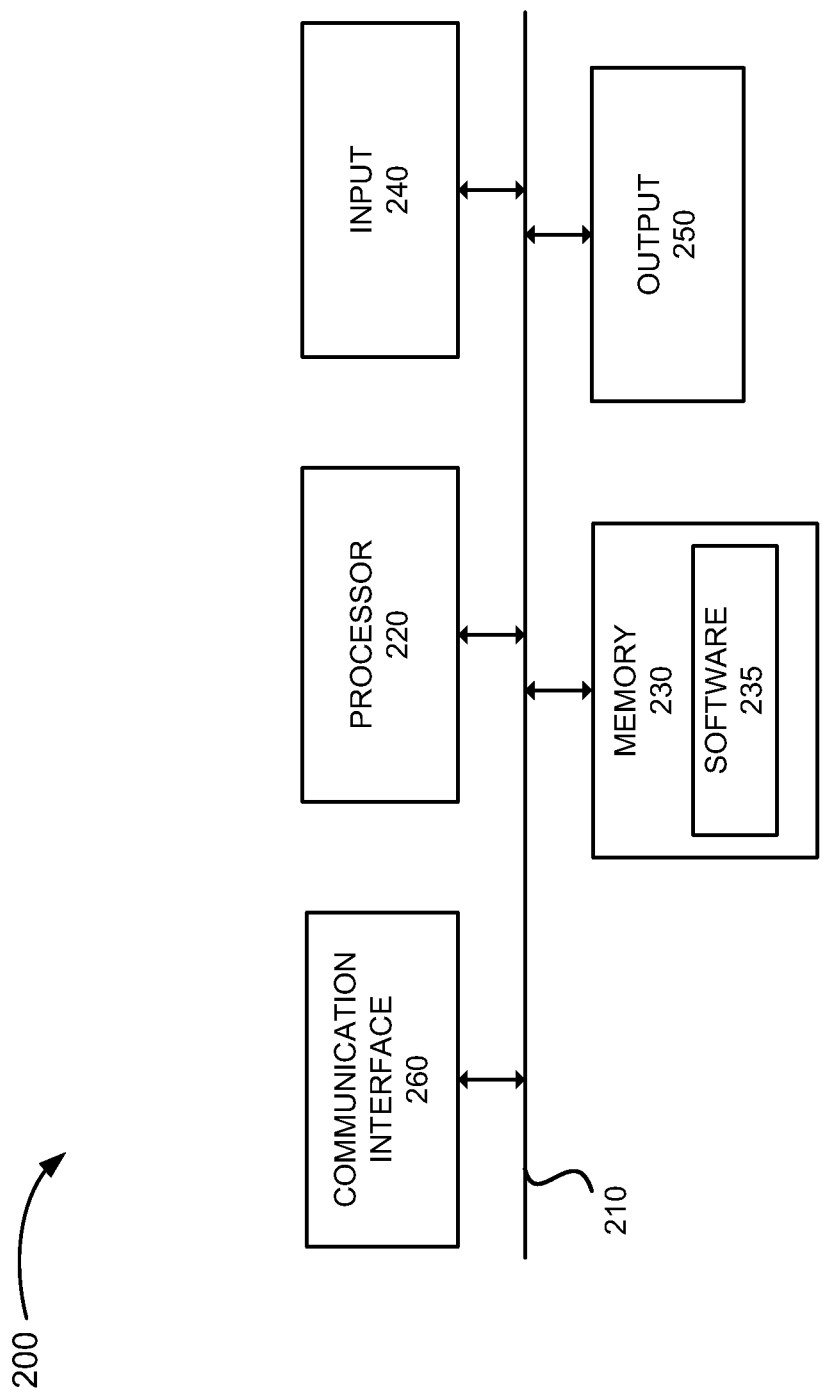
FIG. 2 illustrates exemplary components of a device that may be included in the network environment of FIG. 1 according to an implementation described herein.

FIG. 2 is a diagram illustrating example components of a device 200 according to an implementation described herein. UE device 110, femtocell 120, application server 140, small cell management device 150, and/or macrocells 185 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be further described below, device 200 may perform certain operations relating to the operation of a femtocell (e.g., femtocell 120) that includes a small cell manager that provides a dynamic RF cell-site environment optimization service. Device 200 may perform these operations in response to processor 220 executing software 235 instructions contained in a computer-readable medium, such as memory 230. A computer-readable medium may be defined as a non-transitory memory device. A memory device may be implemented within a single physical memory device or spread across multiple physical memory devices. Software 235 may be read into memory 230 from another computer-readable medium or from another device. Software 235 may include an application that, when executed by processor 220, provides a function of a dynamic RF cell-site environment optimization service. Software 235 may also include firmware, middleware, microcode, hardware description language (HDL), and/or other form of instruction. Software 235 may also be virtualized. Software 235 may further include an operating system (OS) (e.g., Windows, Linux, Android, proprietary, etc.). The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
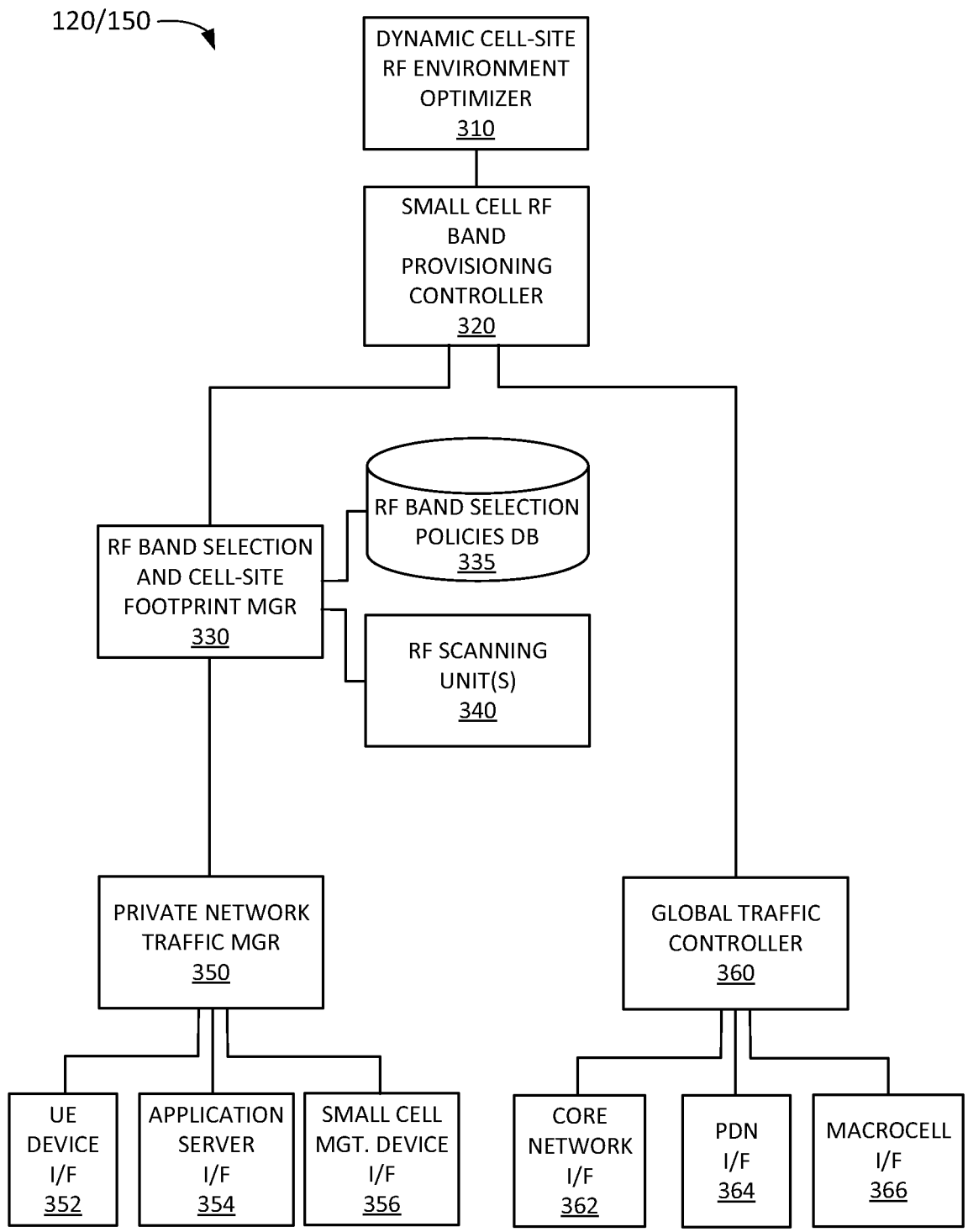
FIG. 3 illustrates exemplary components of the small cell and/or the small cell management device of FIG. 1 according to an implementation described herein.

FIG. 3 is a diagram illustrating exemplary components of femtocell 120 and/or small cell management device 150. The components of femtocell 120 and/or small cell management device 150 may be implemented, for example, via processor 220 executing instructions from memory 230. Alternatively, some or all of the components of femtocell 120 and/or small cell management device 150 may be implemented via hard-wired circuitry.

As shown in FIG. 3, femtocell 120 and/or small cell management device 150 may include a dynamic cell-site RF environment optimizer 310, a small cell RF band provisioning controller 320, an RF band selection and cell-site footprint manager 330, an RF band selection policies DB 335, one or more RF scanning units 340 (referred to herein collectively as "RF scanning units 340" and individually or generally as "RF scanning unit 340"), a private network traffic manager 350, a UE device interface 352, an application server interface 354, a small cell management device interface 356, a global traffic controller 360, a core network interface 362, a PDN interface 364, and a macrocell interface 366.

Dynamic cell-site RF environment optimizer 310 may enable automatic cell-site RF optimization in a high-density deployment of small cell radio access nodes at a customer location. For example, dynamic cell-site RF environment optimizer 310 of a host small cell (e.g., femtocell 120-1) may use current RF band and signal strength information related to RF transmissions from neighboring cells (e.g., femtocells 120) to select a particular RF band for use, to suspend service, and/or to adjust the cell-site footprint of the host small cell (e.g., femtocell 120-1). In this manner, dynamic cell-site RF environment optimizer 310 may mitigate inter-cell (e.g., from femtocells 120) signal interference and facilitate inter-cell (e.g., from femtocell 120-1 to femtocell 120-x or vice versa) handover of a data session.

Small cell RF band provisioning controller 320 may generate instructions for provisioning a host small cell (e.g., femtocell 120-1) based on information obtained, for example, from RF band selection and cell-site footprint manager 330. For example, upon power-up, small cell RF band provisioning controller 320 of the host small cell (e.g., femtocell 120-1) may request and obtain RF band selection information and/or signal transmission power information, and generate instructions for using the selected RF band and/or setting a signal power transmission level. In one implementation, small cell RF band provisioning controller 320 may send the instructions to a transceiver of the host small cell (e.g., femtocell 120-1).

RF band selection and cell-site footprint manager 330 of the host small cell (e.g., femtocell 120-1) may perform a process for selecting a band from among two or more RF bands that may be used by the host small cell (e.g., femtocell 120-1), and/or perform a process for determining a size and/or a location of a footprint of the cell site associated with the host small cell (e.g., femtocell 120-1). In one implementation, RF band selection and cell-site footprint manager 330 may determine that service is to be suspended. For example, RF band selection and cell-site footprint manager 330 may obtain RF signal band and/or strength information from RF scanning unit 340 and corresponding RF band selection policies from RF band selection policies DB 335.

RF band selection policies DB 335 may store information relating to RF band selection rules based on a cell-site's current RF environment. RF band selection using algorithmic determinations are described further below with respect to FIGS. 4 and 5. RF scanning unit 340 may be a dedicated radio for RF spectrum monitoring, such as a "sniffer" receiver, antenna, or other circuitry that may be used to measure the current signal strength of signals from one or more nearby small cells (e.g., femtocells 120).

Private network traffic manager 350 may manage traffic within a private network associated with a high-density small cell deployment architecture. For example, private network traffic manager 350 may maintain a forwarding table, and/or a routing table, for UE devices 110, application servers 140, small cell management device 150, and/or other devices (e.g., network devices), in private network 130 and may route traffic to destination devices in private network 130. UE device interface 352 may be configured to enable communication with UE devices 110. For example, UE device interface 352 may implement a 4G LTE air interface, a 5G NR air interface, and/or a different type of cellular wireless interface. Application server interface 354 may be configured to enable communication with application servers 140. Small cell management interface 356 may be configured to enable communication with small cell management device 150.

Global traffic controller 360 may manage traffic associated with the small cell (e.g., femtocell 120-1), such as traffic destined outside of private network 130. For example, global traffic controller 360 may forward traffic to, and/or communicate with, core network 160, MEC network 170, and/or macrocell 185. Core network interface 362 may enable communication with core network 160 via backhaul link 135. For example, core network interface 362 may implement a set of network interfaces such as, for example, interfaces to communicate with elements in a 4G core network, such as an MME, SGW, PCRF, HSS, etc. and/or interface to communicate with elements in a 5G network, such as an AMF, SMF, PCF, CHF, UDM, AF, NEF, NRF, NSSF, etc. PDN interface 364 may be configured to communicate with PDN 190. Macrocell interface 366 may be configured to communicate with macrocells 185 to enable handovers, for example, between femtocell 120 and macrocell 185.

Although FIG. 3 shows exemplary components of femtocell 120 and/or small cell management device 150, in other implementations, femtocell 120 and/or small cell management device 150 may include fewer components, different components, differently arranged components, or additional components than depicted in FIG. 3. Additionally, or alternatively, one or more components of femtocell 120 and/or small cell management device 150 may perform functions described as being performed by one or more other components of femtocell 120 and/or small cell management device 150.

Figure 4:
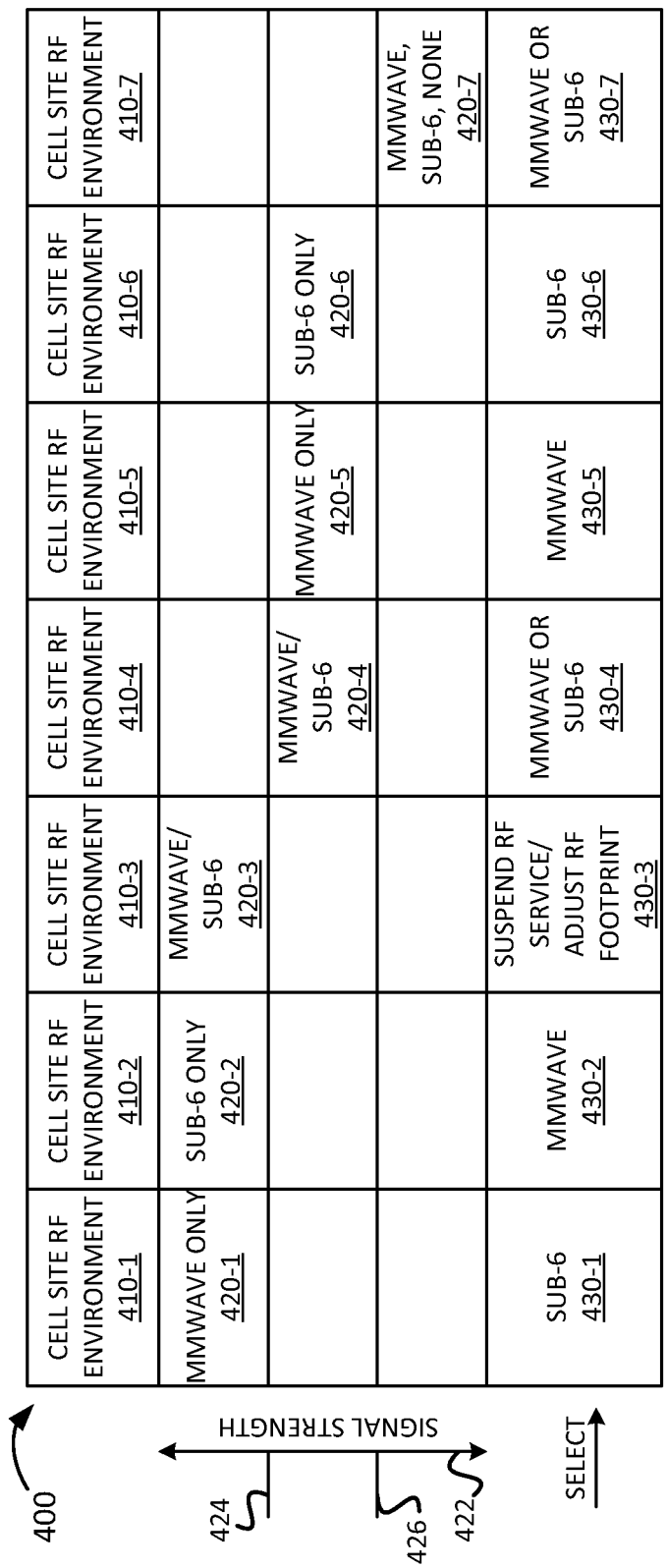
FIG. 4 illustrates an exemplary database structure according to an implementation described herein.

FIG. 4 is a diagram illustrating an exemplary set of RF band selection rules 400 stored in RF band selection policies DB 335 and associated with one or more small cell deployment profiles. In one implementation, a small cell deployment profile may correspond to one enterprise customer and/or a single customer premises. Selection rules 400 may be used for provisioning, for example, femtocell 120-1 shown in FIGS. 5A-B, which may be capable of operating on alternate frequency bands, e.g., mmWave and Sub-6, to generate a cell site 520-1 which may service UE devices 110. In other implementations, additional and/or different frequency bands may be provisioned, such as non-mmWave, unlicensed RF band, C-Band, Citizens Broadband Radio Service (CBRS) band, Megahertz band, or other suitable radio spectrum.

As shown in FIG. 4, a selection 430-x for provisioning femtocell 120-1 may be automatically selected based on local radio conditions that correspond to a cell site RF environment 410-x which is determined for cell site 520-1, shown in FIG. 5. RF environment 410-x may be determined based on one or more RF bands (e.g., mmWave, Sub-6, etc.) and their respective signal strengths 422 that are present in service area 520-1 as detected/measured by femtocell 120-1. For example, signal strengths may include measured signal strength values, such as received signal code power (RSCP), reference signal receive power (RSRP), and/or other signal parameters such as received signal strength indicator (RSSI), reference signal received quality (RSRQ), etc., and/or an aggregated strength value of two or more of these measurements, as well as signal interferences. In one implementation, the measured signal strength values may be grouped into qualitative categories of signal strength value ranges including "strong," i.e., bounded by an upper threshold 424 (e.g., RSCP>−60 dBm or other value associated with likely signal interference); "mid-range," i.e., bounded by upper threshold 424 and a lower threshold 426 (e.g., RSCP≤−115 dBm); and "weak," i.e., bounded by lower threshold 426. Additional and/or different categories and/or value ranges are possible.

Figure 5A:
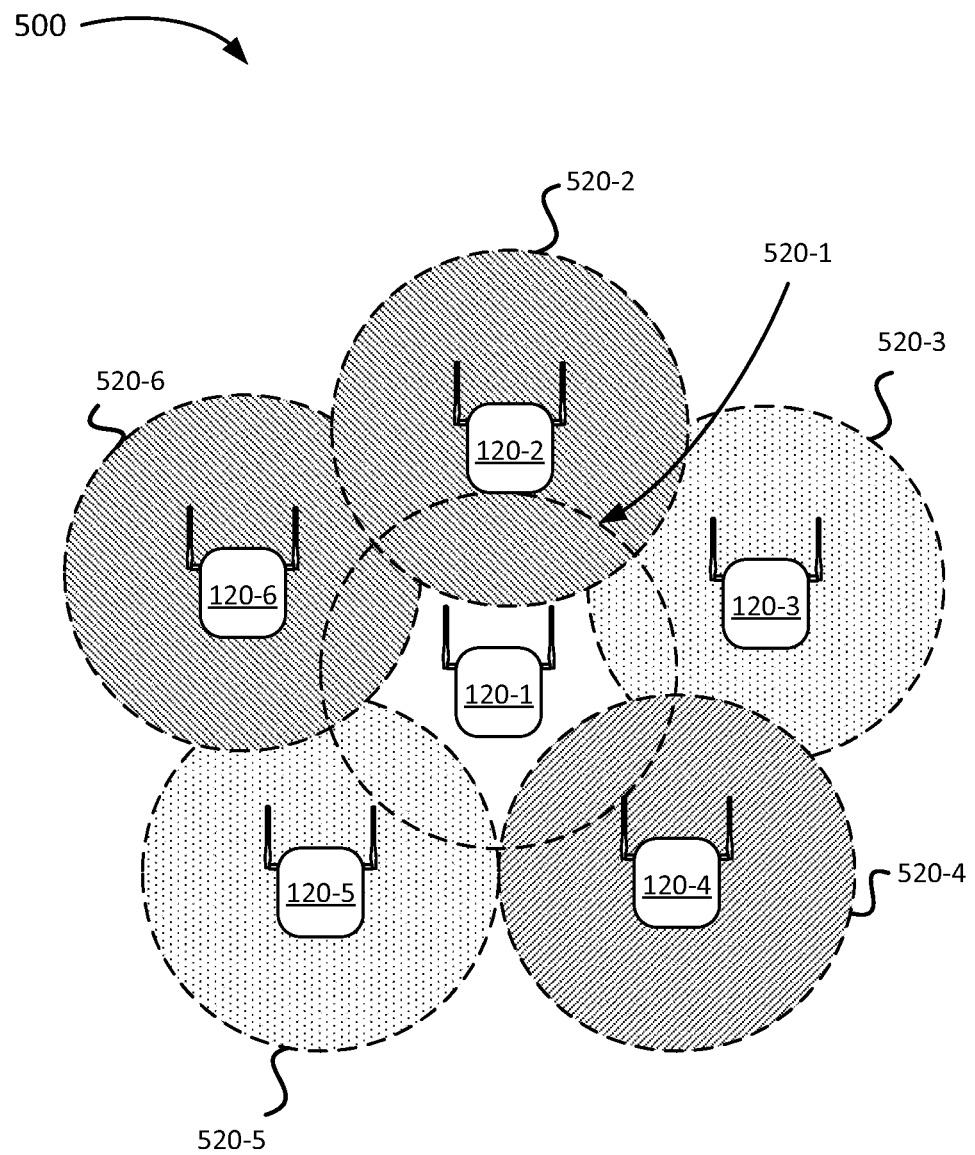
FIGS. 5A-B illustrates exemplary high-density small cell deployments according to an implementation described herein.

As an example, assume that femtocell 120-1 is deployed in a location together with multiple femtocells 120 as shown in FIG. 5A, and that upon powering up, RF scanning unit 340 of femtocell 120-1 performs a scan of cell site 520-1. Based on the scan data, RF band selection and cell-site footprint manager 330 may determine that radio signaling, from one or more of femtocells 120-2, 120-3, 120-4, 120-5, and 120-6, corresponding to cell sites 520-2, 520-3, 520-4, 520-5, and 520-6, respectively, is present in cell site 520-1. RF band selection and cell-site footprint manager 330 may further determine that the radio signaling includes mmWave only 420-1, having a signal strength that is above higher threshold 424. RF band selection and cell-site footprint manager 330 may determine, using selection rules 400, stored in RF band selection policies DB 335, that RF conditions at cell site 520-1 correspond to cell site RF environment 410-1, and as such may make a Sub-6 selection 430-1. Accordingly, small cell RF band provisioning controller 320 may provision femtocell 120-1 to operate on the Sub-6 RF band.

Alternatively, assume that upon powering up, RF scanning unit 340 of femtocell 120-1 performs a scan of cell site 520-1 and based on the scan data, RF band selection and cell-site footprint manager 330 determines that radio signaling, from one or more of femtocells 120-2, 120-3, 120-4, 120-5, and 120-6 includes Sub-6 only 420-2, having a signal strength that is above higher threshold 424. RF band selection and cell-site footprint manager 330 may determine, using RF band selection rules 400, stored in RF band selection policies DB 335, that RF conditions at cell site 520-1 correspond to cell site RF environment 410-2, and as such may select cell site RF environment 430-2. Accordingly, small cell RF band provisioning controller 320 may provision femtocell 120-1 to operate on the mmWave RF band.

As another example, assume that the scan data instead indicates that both mmWave and Sub-6 420-3 radio signals are present in cell site 520-1 in strengths that are above higher threshold 424, corresponding to cell site RF environment 410-3. When femtocell 120-1 is capable of operating over mmWave and Sub-6 only, small cell RF band provisioning controller 320 may make a selection to suspend service or adjust the footprint 430-3 of cell site 520-1. Accordingly, small cell RF band provisioning controller 320 may provision femtocell 120-1 to suspend service altogether until a subsequent scan indicates a change to cell site RF environment 410-3 for a coverage area corresponding to cell site 520-1.

Figure 5B:
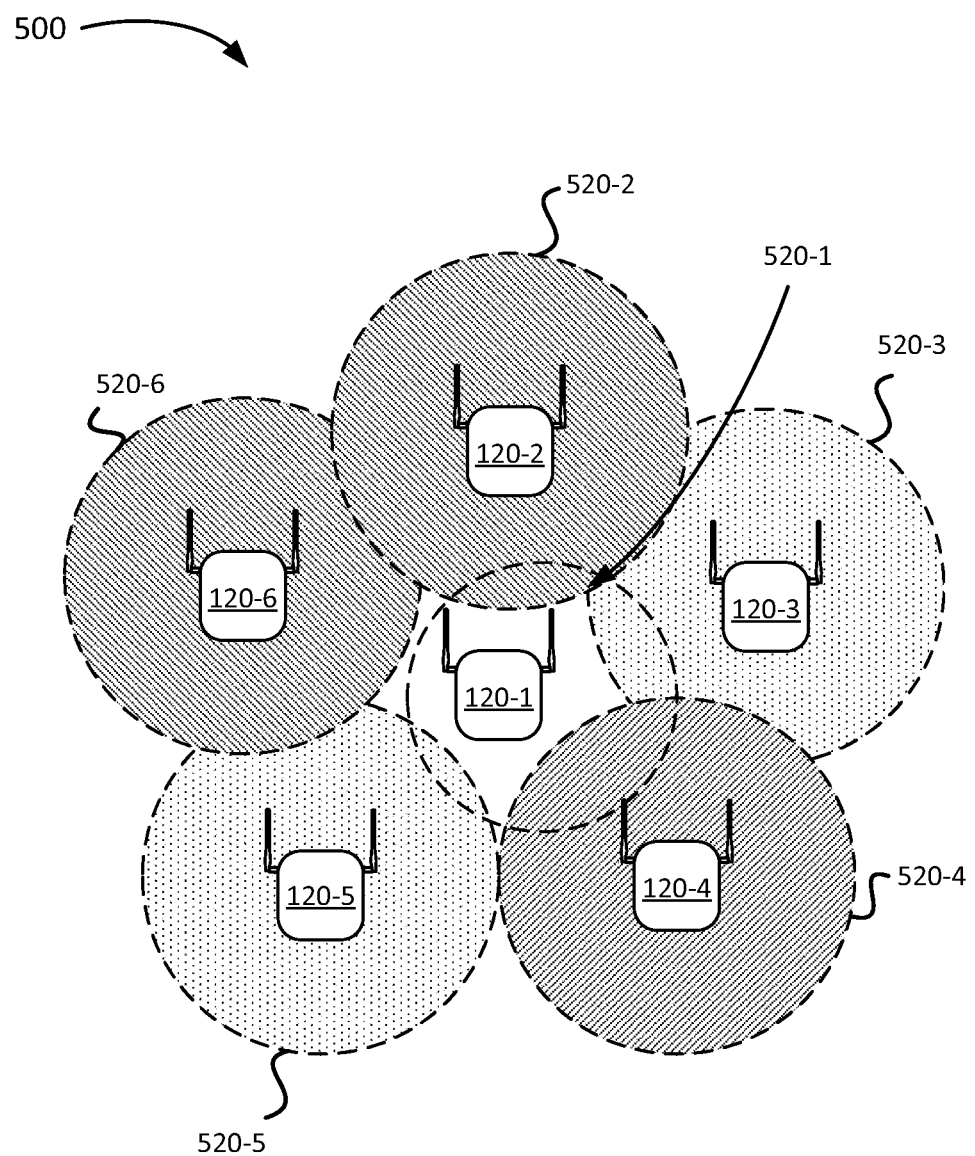

Alternatively, referring to FIG. 5B, small cell RF band provisioning controller 320 may provision femtocell 120-1 with a reduced power transmission level that generates cell site 520-1 with a smaller radius, for example. Assuming that femtocell 120-5 is the source of the "strong" Sub-6 signals and that femtocell 120-6 is the source of the "strong" mmWave signals, cell site 520-1 may be reduced in size so that radio signals associated with cell site 520-5 may be substantially reduced from cell site 520-1, and so that radio signals associated with cell site 520-6 may be substantially eliminated from cell site 520-1. In some implementations, small cell RF band provisioning controller 320 may iteratively reduce transmission power of femtocell 120-1 until RF scanning indicates that "strong" mmWave signals and/or that "strong" Sub-6 signals are not detected in a re-sized cell site 520-1.

As another example, assume that the scan data instead indicates that both mmWave and Sub-6 420-4 radio signals are present in cell site 520-1 in strengths that are below higher threshold 424 and above lower threshold 426 in a mid-range, corresponding to cell site RF environment 410-4. RF band selection and cell-site footprint manager 330 may make an mmWave selection 430-4, for example, when a premium is placed on higher throughput for data sessions for connections via femtocell 120-1, or a Sub-6 selection, for example, when a premium is placed on service coverage within cell site 520-1. Accordingly, small cell RF band provisioning controller 320 may provision femtocell 120-1 to operate on the mmWave RF band.

As another example, assume that the scan data instead indicates that radio signals of mmWave only 420-5 are present in cell site 520-1 in strengths that are below higher threshold 424 and above lower threshold 426 in the mid-range, corresponding to cell site RF environment 410-5. RF band selection and cell-site footprint manager 330 may make an mmWave selection 430-5, for example, to facilitate a potential handover of a connection with femtocell 120-1 to femtocell 120-x using the mmWave RF band. Accordingly, small cell RF band provisioning controller 320 may provision femtocell 120-1 to operate on the mmWave RF band.

As another example, assume that the scan data instead indicates that radio signals of Sub-6 only 420-6 are present in cell site 520-1 in strengths that are below higher threshold 424 and above lower threshold 426 in the mid-range, corresponding to cell site RF environment 410-6. RF band selection and cell-site footprint manager 330 may make Sub-6 selection 430-6, for example, to facilitate a potential handover of a connection with femtocell 120-1 to femtocell 120-x using the Sub-6 band. Accordingly, small cell RF band provisioning controller 320 may provision femtocell 120-1 to operate on the Sub-6 RF band.

As yet another example, assume that the scan data instead indicates that both mmWave and Sub-6 420-4 radio signals are present in cell site 520-1 in strengths that are below higher threshold 424 and above lower threshold 426 in a mid-range, or that no RF bands are present in cell site 520-1, corresponding to cell site RF environment 410-7. RF band selection and cell-site footprint manager 330 may make an mmWave selection 430-7, for example, when a premium is placed on higher throughput for data sessions for connections via femtocell 120-1 or, alternatively, cell-site footprint manager 330 may make a Sub-6 selection 430-7, for example, when a premium is placed on service coverage within cell site 520-1. Accordingly, small cell RF band provisioning controller 320 may provision femtocell 120-1 to operate on the mmWave RF band or the Sub-6 RF band as appropriate.

Although FIG. 4 shows exemplary RF band selection rules 400, in other implementations, RF band selection rules 400 may include different and/or additional cell site RF environments 410, RF band categories 420, and/or selections 430, than are depicted in FIG. 4. Also, threshold 424 may be set to a value (e.g., RSCP, RSRP, RSSI, RSRQ, etc.) at which signal interference within cell site 520-1 is most likely to occur, and/or threshold 426 may be set to a value (e.g., RSCP, RSRP, RSSI, RSRQ, etc.) at which signal interference within cell site 520-1 is most likely not to occur, but additional or different signal strength thresholds may be set. Furthermore, performance criteria other than handover facility, throughput, and bandwidth may be used to as bases for RF band selections 430. In one implementation, selection rules 400 may be customizable by an operator and/or may be configured and/or adjusted using artificial intelligence and/or machine learning. In some implementations, selection rules 400 may be dynamically adjusted based on current network conditions and/or some other metric related to operating efficiency.

Figure 6:
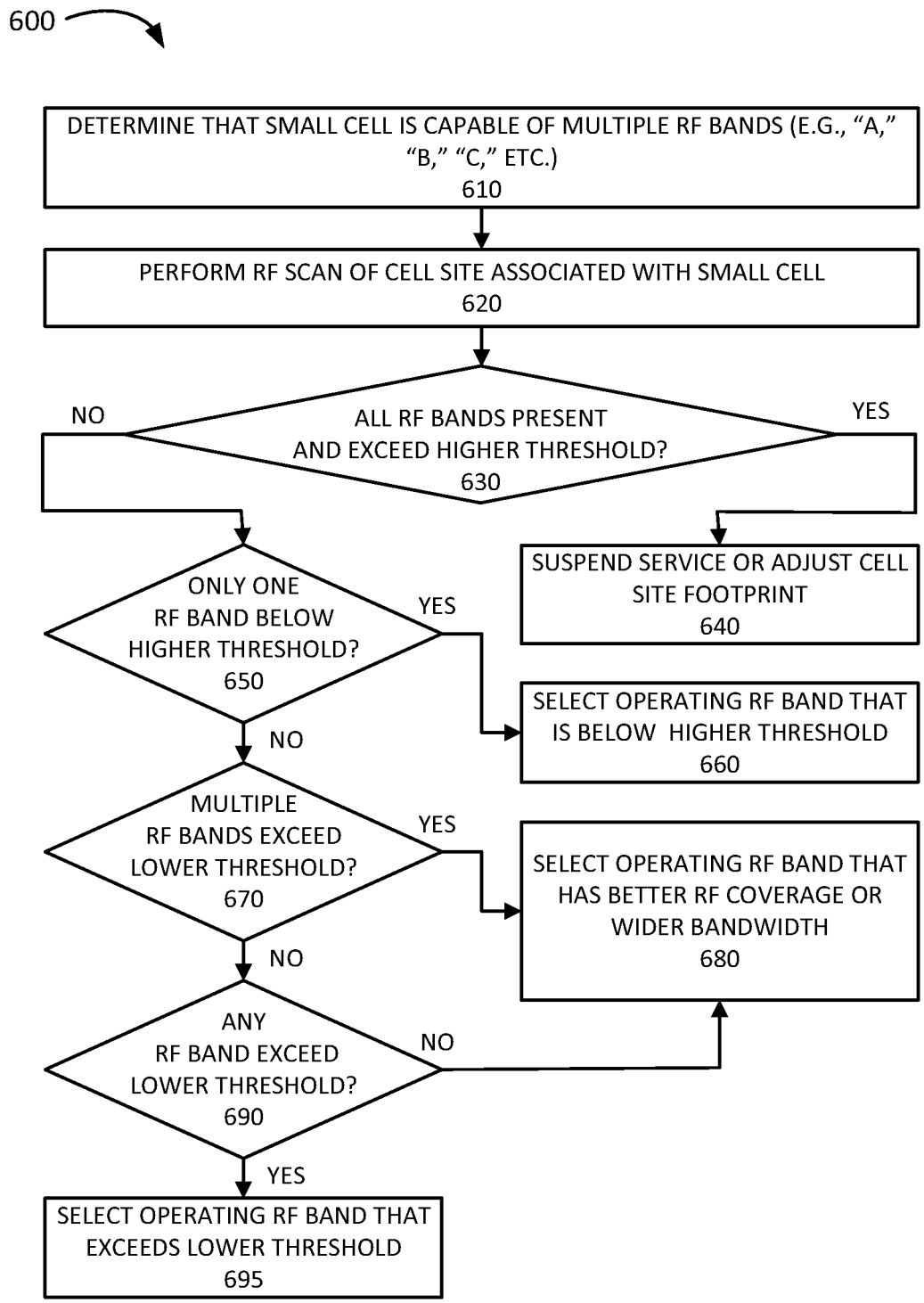
FIG. 6 illustrates a flowchart of a process for configuring a small cell according to an implementation described herein.

FIG. 6 illustrates a flowchart of a process 600 for dynamic small cell RF optimization according to an implementation described herein. In some implementations, process 600 may be performed by femtocell 120. In other implementations, some or all of process 600 may be performed by another device or a group of devices separate from femtocell 120. In other implementations, some or all of process 600 may be performed by small cell management device 150 in coordinating provisioning of multiple femtocells 120.

As shown in FIG. 6, process 600 may include determining that a small cell (e.g., femtocell 120) includes more than one RF operating band (e.g., RF bands "A," "B," "C," etc.) (block 610). Upon power-up, the small cell may scan its service area to determine an RF signaling presence due to neighboring small cells in a high-density deployment (block 620). For example, the small cell may include a dedicated radio for RF spectrum monitoring to detect the presence of RF signals corresponding to the small cell's operating bands (e.g., RF bands "A," "B," "C," etc.) and, if any, their associated signal strengths. Based on the scan data regarding the local radio conditions, the small cell may use RF band selection rules to determine whether the signal strengths of signals corresponding to each of its operating bands (e.g., RF bands "A," "B," and "C," etc.) are all above a predetermined upper threshold value (block 630). For example, the upper threshold value may correspond to substantial inter-cell signal interference. When it is determined that all of the signal strengths are above the predetermined upper threshold value (block 630—YES), service provided by the small cell may be suspended or, alternatively, the small cell may be provisioned with transmission power reduced for the small cell until the small cell's cell site is substantially free of inter-cell interference for one of the small cell's operating RF bands (block 640), and process 600 may end.

Alternatively, when it is determined that not all of the signal strengths are above the predetermined upper threshold value (block 630—NO), process 600 may include determining whether the signal strength of a signal in only one of its RF operating bands is below the upper threshold value (block 650). Based on a determination that only one of the signal strengths is below the upper threshold value (block 650—YES), process 600 may include selecting that RF operating band (block 660). Alternatively, based on a determination that more than one of the signal strengths does are below the upper threshold value (block 650—NO), process 600 may include determining whether multiple signal strengths exceed a predetermined lower threshold value (block 670) and, if yes (block 670—YES), RF band selection rules may select among the available operating bands based on signal characteristics corresponding to each of the RF bands to determine the optimal RF operating band (block 680).

For example, if a user profile associated with the small cell indicates that UE devices 110 associated with the small cell are relatively non-mobile with respect to the small cell, RF band selection rules may instruct that a lower frequency RF band be selected for superior service coverage at the cell site. On the other hand, if the user profile indicates that UE devices 110 are relatively mobile with respect to the small cell, RF band selection rules may instruct that a higher frequency RF band be selected to provide higher bandwidth. Other performance parameters may be used to select the optimal RF operating bands among the RF bands available.

Alternatively, based on a determination that multiple operating bands do not exceed the predetermined lower threshold value (block 670—NO), process 600 may include determining whether the strength of any of the detected RF operating bands are at strengths that exceed the lower threshold value (block 690). If none of the strengths exceed the lower threshold, then one of the RF operating bands may be selected as discussed above with respect to block 680. Alternatively, if one of the strengths exceeds the lower threshold value (block 690—YES), process 600 may include selecting the RF operating band that exceeds the lower threshold value (block 695). In response to blocks 660, 680, and 695, small cell RF band provisioning controller 320 may provision the small cell to operate on the selected RF band.

Figure 7:
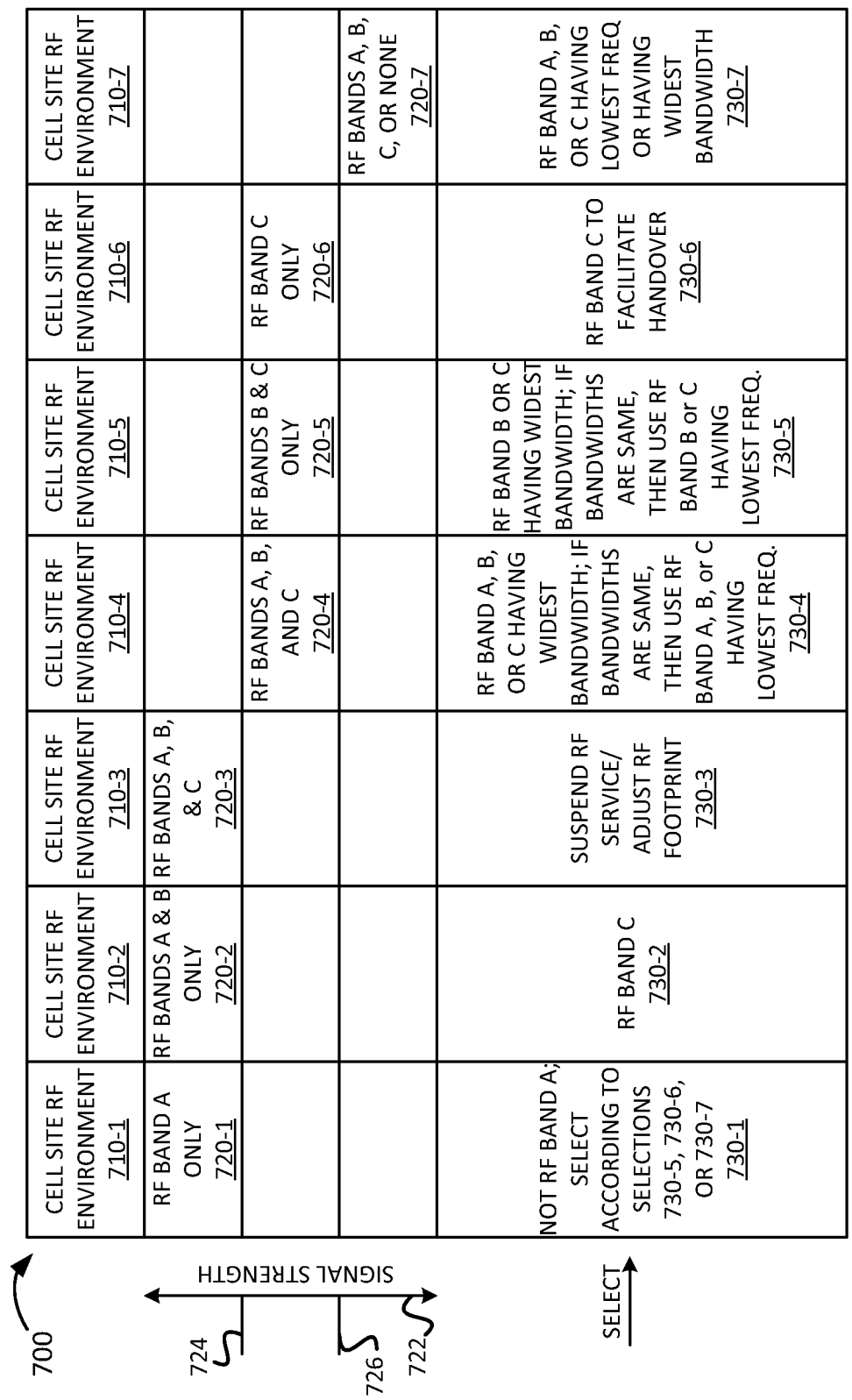
FIG. 7 illustrates another exemplary database structure according to an implementation described herein.

FIG. 7 is a diagram illustrating an exemplary set of RF band selection rules 700 that may be used for provisioning, for example, femtocell 120-1 shown in FIGS. 5A-B, which may be capable of alternately operating on three different RF frequency bands, e.g., "A," "B," "C," to configure a cell site 520-1 that may service UE devices 110. In this example, when only RF Band A is detected (720-1) at strengths above a higher threshold 724, cell site RF environment 710-1 may be optimized by not selecting RF Band A and instead selecting RF Band B or RF Band C (730-1) according to the rules illustrated in 730-5, 730-6, or 730-7 described below.

Further to the example, when only RF Band A and RF Band B are detected (720-2) at strengths above higher threshold 724, cell cite RF environment 710-2 may be optimized by selecting RF Band C (730-2). Further to the example, when each of RF Band A, RF Band B, and RF Band C are detected (720-3) at strengths above higher threshold 724, cell cite RF environment 710-3 may be optimized by suspending RF service of femtocell 120-1 or adjusting the RF footprint of cell site 520-1 (730-3) substantially in the manner described above. Further to the example, when each of RF Band A, RF Band B, and RF Band C are detected (720-4) at strengths in a range between higher threshold 724 and a lower threshold 726, cell cite RF environment 710-4 may be optimized by selecting the RF band that has the widest bandwidth or, if the bandwidths are the same, selecting the RF Band A, B, or C having the lowest frequency (730-4). Further to the example, when only RF Band B and RF Band C are detected (720-5) at strengths in a range between higher threshold 724 and lower threshold 726, cell cite RF environment 710-5 may be optimized by selecting RF Band B or RF Band C having the widest bandwidth or, if the bandwidths are the same, selecting the RF Band B or RF band C having the lowest frequency (730-5). Further to the example, when only RF Band C is detected (720-6) at strengths in a range between higher threshold 724 and lower threshold 726, cell cite RF environment 710-6 may be optimized by selecting RF Band C to facilitate handover (730-6) in the event that UE device 110 moves from cell site 520-1 to cell site 520-x using RF Band C. Finally, when RF Band A, RF Band B, RF Band C, or none of these are detected (720-7) at strengths below lower threshold 726, cell site RF environment 710-7 may be optimized by selecting RF Band A, RF Band B, or RF Band C having the lowest frequency or, alternatively, having the highest bandwidth (730-7).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a device, whether a small cell radio access node is configured to operate at a plurality of radio frequency (RF) bands;
    scanning, by the device and based on a determination that the small cell radio access node is configured to operate at the plurality of RF bands, a radio service area to detect a plurality of radio signals in multiple RF bands of the plurality of RF bands;
    determining, by the device, a signal strength associated with each of the multiple RF bands;

comparing, by the device, the signal strengths relative to a first signal strength threshold value and a second signal strength threshold value;

selecting, by the device for the small cell radio access node based on the comparing, an operating RF band from the multiple RF bands; and reducing an RF coverage of the radio service area.

2. The method of claim 1, wherein, when none of the associated signal strengths exceed the first signal strength threshold value and when a same bandwidth is associated with each of the RF bands, the selecting further comprises selecting the operating RF band having a lowest frequency of the multiple RF bands.

3. The method of claim 1, further comprising:

provisioning the small cell radio access node to use the operating RF band to provide the RF coverage of the radio service area.

4. The method of claim 1, wherein, when the associated signal strengths exceed the first signal strength threshold value, the method further comprises disabling an RF service of the small cell radio access node.

5. The method of claim 1, wherein reducing the RF coverage of the radio service area is based on the associated signal strengths exceeding the first signal strength threshold value.

6. The method of claim 1, further comprising not selecting, for the operating RF band, one or more RF bands for which an associated signal strength exceeds the first signal strength threshold value and is below the second signal strength threshold value.

7. The method of claim 1, wherein the signal strength comprises at least one of a received signal code power (RSCP), a reference signal receive power (RSRP), or a received signal strength indicator (RSSI).

8. A device comprising:

a processor configured to:

determine whether a small cell radio access node is configured to operate at a plurality of radio frequency (RF) bands;

scan, based on a determination that the small cell radio access node is configured to operate at the RF bands, a radio service area to detect a plurality of radio signals in multiple RF bands of the plurality of RF bands;

determine a signal strength associated with each of the multiple RF bands;

compare the signal strengths relative to a first signal strength threshold value and a second signal strength threshold value;

select, for the small cell radio access node based on the comparison, an operating RF band from the multiple RF bands; and reduce an RF coverage of the radio service area.

9. The device of claim 8, wherein the small cell radio access node comprises a femtocell.

10. The device of claim 8, wherein the processor is further configured to:

provision the small cell radio access node to provide the RF coverage of the radio service area at the operating RF band.

11. The device of claim 8, wherein, when the associated signal strengths exceed the first signal strength threshold value, the processor is further configured to disable an RF service of the small cell radio access node.

12. The device of claim 8, wherein the signal strength comprises a received signal strength indicator (RSSI).

13. The device of claim 8, wherein the processor is further configured to:

not select, for the operating RF band, one or more RF bands for which an associated signal exceeds the first signal strength threshold value and is below the second signal strength threshold value.

14. The device of claim 8, wherein the signal strength comprises at least one of a received signal code power (RSCP) or a reference signal receive power (RSRP).

15. A non-transitory, computer-readable storage medium storing instructions executable by a processor of a device, which when executed cause the device to:

determine whether a small cell radio access node is configured to operate at a plurality of radio frequency (RF) bands;

scan, based on a determination that the small cell radio access node is configured to operate at the plurality of RF bands, a radio service area to detect a plurality of radio signals in multiple RF bands of the plurality of RF bands;

determine a signal strength associated with each of the multiple RF bands;

compare the signal strengths relative to a first signal strength threshold value and a second signal strength threshold value;

select, for the small cell radio access node based on the comparison, an operating RF band from the multiple RF bands; and reduce an RF coverage of the radio service area.

16. The non-transitory, computer-readable storage medium of claim 15, wherein the small cell radio access node comprises a femtocell.

17. The non-transitory, computer-readable storage medium of claim 15, wherein the instructions further cause the device to:

provision the small cell radio access node to provide the RF coverage of the radio service area at the operating RF band.

18. The non-transitory, computer-readable storage medium of claim 15, wherein, when the associated signal strengths exceed the first signal strength threshold value, the instructions further cause the device to disable an RF service of the small cell radio access node.

19. The non-transitory, computer-readable storage medium of claim 15, wherein signal strength comprises at least one of a received signal code power (RSCP), a reference signal receive power (RSRP), or a received signal strength indicator (RSSI).

20. The non-transitory, computer-readable storage medium of claim 15, wherein the instructions further cause the device to:

not select, for the operating RF band, one or more RF bands for which an associated signal strength exceeds the first signal strength threshold value and is below the second signal strength threshold value.

* * * * *